(12) United States Patent
Young et al.

(10) Patent No.: US 6,837,424 B2
(45) Date of Patent: Jan. 4, 2005

(54) CHEQUE PROCESSOR

(75) Inventors: Alex Young, London (GB); Leonie Catherine Roberts, Sussex (GB); Terrence Alexander O'Donnell, London (GB); Christopher John Perfect, Surrey (GB); Nicholas Baker, Beds (GB); Iain MacPhail, London (GB)

(73) Assignee: ACP Systems LTD (GB)

( * ) Notice: Subject to any disclaimer, the term of this patent is extended or adjusted under 35 U.S.C. 154(b) by 0 days.

(21) Appl. No.: 10/208,902

(22) Filed: Jul. 31, 2002

(65) Prior Publication Data
US 2003/0024978 A1 Feb. 6, 2003

(30) Foreign Application Priority Data

Aug. 1, 2001 (GB) .............................. 0118772
Feb. 1, 2002 (GB) .............................. 0202422

(51) Int. Cl.[7] .............................................. G06F 17/00
(52) U.S. Cl. ....................................... 235/375; 235/379
(58) Field of Search ................................ 235/375, 379, 235/380, 449; 902/8, 10, 15; 705/35, 39, 44, 45

(56) References Cited

U.S. PATENT DOCUMENTS

| 4,264,808 A | 4/1981 | Owens et al. |
| 4,321,672 A | 3/1982 | Braun et al. |
| 6,129,270 A | 10/2000 | Piazza |

FOREIGN PATENT DOCUMENTS

| DE | 196 00769 A1 | 7/1997 | |
| DE | 19600769 A | 7/1997 | |
| DE | 19600769 * | 7/1997 | .......... G08B/13/22 |
| EP | 0 593 209 A2 | 4/1994 | |
| EP | 0 661 654 A2 | 7/1995 | |
| EP | 0 903 701 A1 | 3/1999 | |
| EP | 0 984 410 A1 | 3/2000 | |
| EP | 0 984 410 A1 | 8/2000 | |
| WO | WO 98/03942 | 1/1998 | |

OTHER PUBLICATIONS

UK Patent Office Search Report dated Sep. 12, 2001, 5pgs.

* cited by examiner

*Primary Examiner*—Daniel Stcyr
(74) *Attorney, Agent, or Firm*—Buckley, Maschoff & Talwalkar LLC

(57) ABSTRACT

The present invention provides an apparatus for processing of checks and includes a closed casing (1) having an opening defining a feed path (5) for the insertion of a check, and an optical scanner (3) for receiving a check fed into the casing (1) and recording data representing information on the face of the check. The apparatus includes a cancellation device (4) to cancel the check concurrently with the scanning and a communications device (2,9) for transmitting recorded data to a remote location. The invention is intended for distribution to end users, the drawees of checks, or as a component part of an automatic teller machine, such that a bank can trust that a digital check received from the apparatus via a communications network is as secure against being fraudulently deposited as if the check had been physically delivered in the conventional manner.

16 Claims, 4 Drawing Sheets

CHEQUE PROCESSOR

FIELD OF THE INVENTION

The present invention relates to a cheque processor enabling the digital transfer of essential cheque information and providing a method for remote depositing of paper cheques. It may also be applied to remittance slips, traveller cheques, company cheques and other forms of bill of exchange, for example as defined by the Bills of Exchange Act 1882.

BACKGROUND TO THE INVENTION

In 1999, 2.8 billion cheque transactions occurred in Great Britain. It is predicted that by 2009 the number will have reduced to 1.7 billion. Paper cheque use is decreasing due to the increased use of credit and debit cards, in addition to internet-based payment systems. The long term objective is to replace all paper cheque transactions with electronic transactions. In the meantime, there is a need for an interim solution to soften this transition.

The paper cheque is widely used by both private individuals and businesses, yet it is an inconvenient form of payment for the following reasons:

1. the drawer needs to endorse and physically deliver the cheque;

2. the drawee needs to take receipt of it, to physically deliver it to a bank, and subsequently to wait 3 working days for the transaction to be complete; and, 3. the banks waste a great deal of resources processing paper cheques and other bills of exchange.

Since The Deregulation (Bills of Exchange) Order 1996, it has become legal for "a banker [to] present a cheque for payment to the banker whom it is drawn by notifying him of its essential features by electronic means or otherwise, instead of by presenting the cheque itself". While it would be possible to provide a digital representation of a bill of exchange using a simple combination of a scanner attached to a networked computer, such a solution would be unacceptable, as it offers no guarantee that the digital representation accurately and uniquely represents the original cheque. An integral part of any such solution would therefore necessarily include security sufficient to provide an equivalent to existing conditions, such that confidence can safely be built around a new banking methodology. As such, the transaction must involve guaranteed non-duplication of the original cheque, to emulate the physical presentment systems currently in use. In addition, all of the essential features of the paper cheque, as defined by, for example, the Bills of Exchange Act 1882, must be evident in any digital representation, and other convenient features such as Magnetic Image Character Recognition (MICR)-encoded data may also be included.

European publication EP-A-0,984,410 describes a system for scanning a paper cheque in which the scanned image is processed and transmitted to a remote location where the image can be recreated into a paper form. However, this requires an ATM customer or bank teller to first input the value of the cheque which is then verified by the system using optical character recognition techniques. Only after the cheque has been accepted and the amounts determined to agree is the cheque cancelled. Indeed, in some circumstances the cheque may not be cancelled until the image data representing the cheque has been successfully transferred. These features represent a serious flaw in the security of the system since the device may be tampered with between the steps of scanning and cancellation allowing a potentially successful replay attack to be made using the same cheque by a fraudulent user.

SUMMARY OF THE INVENTION

According to the present invention there is provided an apparatus for processing cheques comprising:

a closed casing having an opening defining a feed path for the insertion of a cheque;

a scanner for receiving a cheque fed into the casing and for recording a digital image of the cheque;

a cancellation device which is operative to cancel the cheque concurrently with scanning; and, a communications device for transmitting the digital image of the cheque to a remote location.

In the present invention, the scanner reads, preferably the optical, and also optionally magnetic, information from the face of the cheque. The width of the optical reading area must be large enough to encompass a sufficient area of the cheque within the width of the feed path, and preferably it must be capable of digitising the image to a sufficiently high resolution that substantially all relevant visual information can be unambiguously determined from the subsequent image, and any of which is not read visually must be read by magnetic means. The information needed includes, but is not limited to, the serial number of the cheque, the code identifying the banker on whom the cheque is drawn, the account number of the drawer of the cheque and the amount of the cheque entered by the drawer of the cheque.

Preferably, the scanner is a reflected image scanner rather than a transverse image scanner, as the light source for a transverse image scanner would need to be more powerful than that for a reflected image scanner, and as such would represent inefficiency.

The scanner communicates data representing the digitised cheque image either concurrently while the cheque is being scanned, or after the cheque has entirely passed over the scanner, for further processing and onward transmission.

The cancellation device serves to physically alter the cheque such that if a cheque is processed by the apparatus more than once, either further processing will physically be prevented, or the alteration will be evident in the digitised representation such that the cheque cannot successfully be processed twice. The effect of the cancellation device can be to puncture, watermark, emboss, shred, cut, scorch or otherwise mark by scorching or printing upon the cheque.

If a foreign object is introduced into the feed path such that it damages the cancellation device, the cancellation device may no longer perform its required function. This may also occur if a concerted effort has been made to circumvent the cancellation action for fraudulent effect. In order to guard against this, and to prevent a single cheque being processed more than once, the present invention provides a method by which the control device can verify the functionality of the cancellation device. For example, if the cancellation device acts by cutting the cheque in half, sensors may be provided to indicate that the blades used are present and unharmed during the cutting operation. In another example, the cancellation could be performed by perforation of the cheque by pins mounted on a rotating roller. In this instance, the sensors would need to provide evidence that the pins were present and in a position to correctly puncture the paper. This sensing could be performed by a capacitive sensor, such that the pins form one 'plate' of a capacitor, and the other plate is mounted beneath the feed path. With such an arrangement, the distance to the pins can be measured, and any removal of the pins would be evident as a change in capacitance of the circuit. Alternatively, if the pins are manufactured from a ferromagnetic material, their presence or absence can be verified by measurement of the variation of the local magnetic field as the roller rotates with, for example, a Hall effect sensor.

Preferably, the apparatus comprises a feed drive that transports the cheque past the scanner at the same time as the cancellation device acts, ensuring simultaneous operation. As such, the method of operation of the cancellation device may allow it also to operate as the feed drive. Preferably, the feed drive is operative to return the cancelled cheque. This may be via the same or some other opening in the casing.

A communications port allows the apparatus to communicate with a remote server either via a host computer or with direct connection to a communications network, using a standard communications protocol and hardware appropriate for the task, such as USB for computer communications, or IEEE 802.11b for wireless network communications.

Preferably, the apparatus comprises a control device that provides power and control to the scanner, the cancellation device, and the feed drive, and coordinates them if they require separate control signals. It performs the required processing on the digitised cheque image received from the scanner such that it can prepare the digital representation of the cheque for onward transmission including any necessary cryptographic functions that are required. As such the control device preferably includes a microprocessor either capable of performing all of the required processing itself, or of coordinating additional processing hardware (external to the microprocessor) to the required end. The additional hardware may include such dedicated cryptographic processors as may be required by the protocols in use in any process incorporating the apparatus.

Preferably, the control device also performs any necessary integrity checks that are required to ensure that all of the essential features are performing as specified.

The external features of the present invention preferably comprise a partially airtight solid casing, a feed path and optionally a communications port if the communications system used requires it. The feed path is an integral part of the casing of the apparatus, which serves to ensure the correct positioning of the paper cheque. The width of the feed path can accommodate any height of document (such as a remittance slip or company cheque), but will usually be sufficient for a personal cheque. The communications port allows the inputting of user-specific information into the device via an external system, which obviates the need for a built-in terminal. If the communications system requires no communications port, then the internal communications device can provide this functionality.

In the instance where there is secret information stored in the apparatus for use by the control device in cryptographic functions, there is in addition to the aforementioned internal features a security device that prevents the secret data from being read if the external casing is removed. As such, it must be capable of being activated in the absence of an external power source. Preferably, the external casing is airtight at least in the region where the secret information is held and any regions over which it or data by which it may be identified will be transmitted during normal operation of the apparatus. The internal atmosphere of the apparatus as maintained by an airtight section within the external casing is configured to be at a different pressure to the external atmosphere, such that there will be a detectable change in pressure if the external casing is breached. In the event of such a breach, the security device will act to render the secret data invalid. The data protected by the security device may also include computer software for the control device, such that the control device will not function if the security device is tampered with.

The present invention is intended for distribution to end users, the drawees of the cheques, or as a component part of an Automatic Telling Machine (ATM), such that a banker can trust that a digital cheque received from the invention via a communications network is as secure against being fraudulently deposited as if the cheque had been physically given to him. In that sense, the invention, while not being supervised by trained personnel, can transmit cryptographically trusted information, providing the process with protection against subversion through physical or other means. As a distributed solution, this confers advantage to the drawee, unlike the majority of technical advancements in this field, while also reducing the administrative burden on the banker, facilitating the banking of bills of exchange independent of the banks' proper or designated places.

BRIEF DESCRIPTION OF THE DRAWINGS

An example of the present invention will now be described in detail with reference to the accompanying drawings; in which.

DETAILED DESCRIPTION

Figure 1:
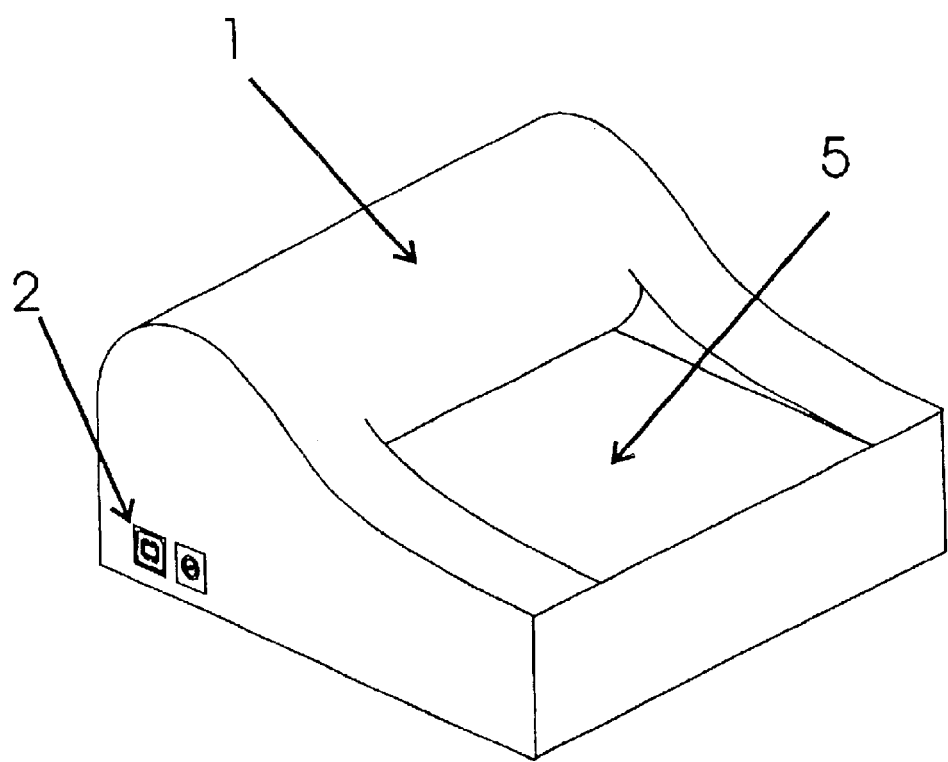
FIGS. 1 and 2 illustrate simplified schematic, external and lateral sections, respectively, of an example of an apparatus in accordance with the present invention.
Figure 2:
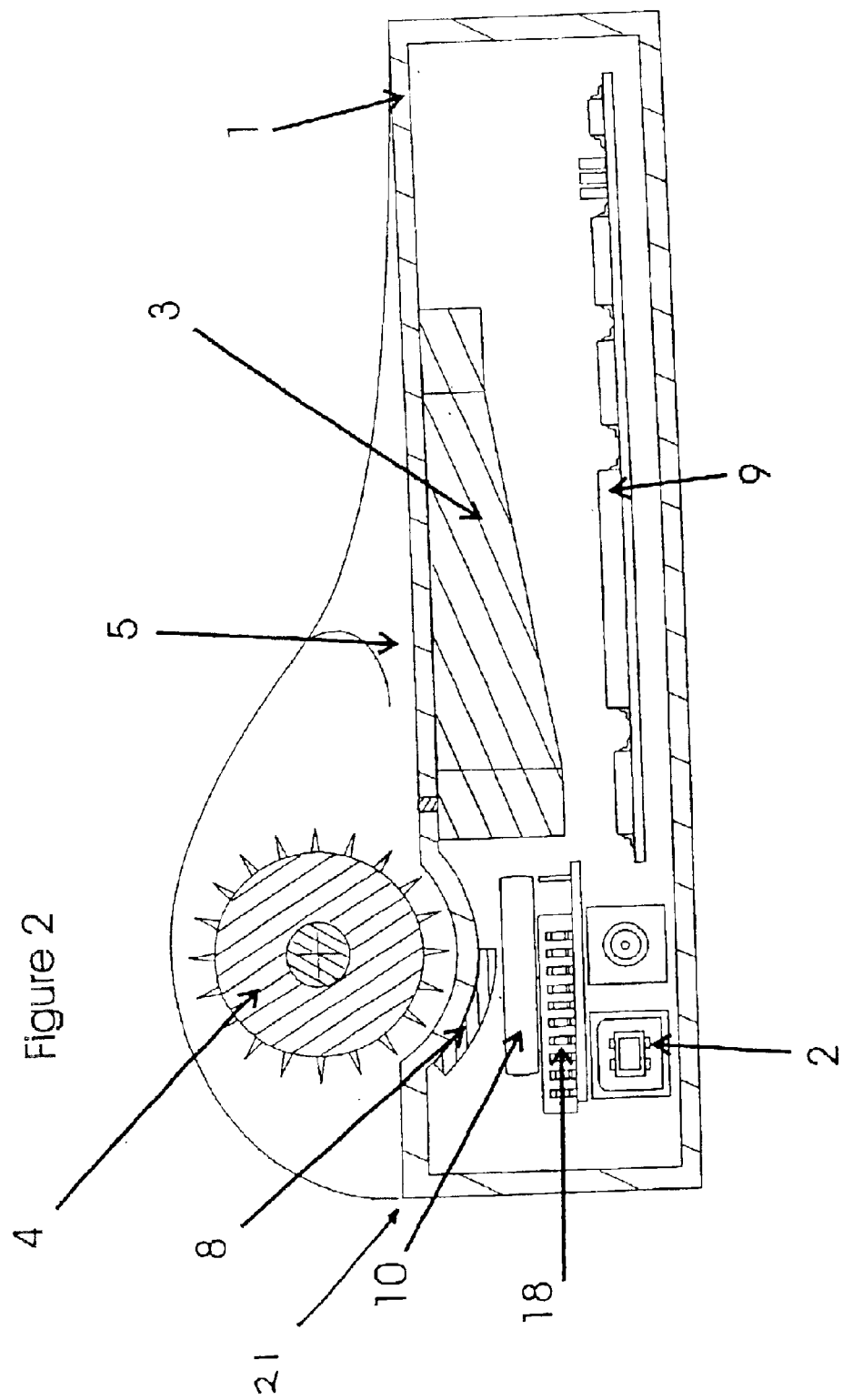

The example of an apparatus of the present invention shown in FIGS. 1 and 2 incorporates an external casing 1 and a communications port 2, that may be compatible with any of the communications ports found on a personal computer. In this case, it is assumed to be a USB port. In addition, the apparatus incorporates a digital scanner 3 and a roller mechanism 4. The roller mechanism operates as a cancellation and motive device. The apparatus also incorporates a cheque feed path 5, in this case a horizontal platform, which serves to align the cheque correctly.

When the apparatus receives the relevant signal via the communications port 2, the controller 9, which is comprised of a microprocessor, RAM, ROM and cryptographic ASICs, in addition to the necessary interfaces to the other internal and external devices, it starts the roller mechanism 4, and causes the digital scanner 3 to start sending visual data to it. When the cheque has passed out of the field of view of the digital scanner 3, the controller 9 stops the digital scanner 3, but allows the roller mechanism 4 to continue for a short time before stopping to ensure that the cheque has passed cleanly out of the apparatus via an opening 21.

Having received all of the visual data from the digital scanner 3, the controller 9 encrypts the data, incorporating any relevant data also received via the communication port 2, using a key loaded from the EPROM 18 protected by the security device 10. The controller 9 then transmits the encrypted data to an external destination via the communications port 2, and enters a waiting state.

Figure 3A:
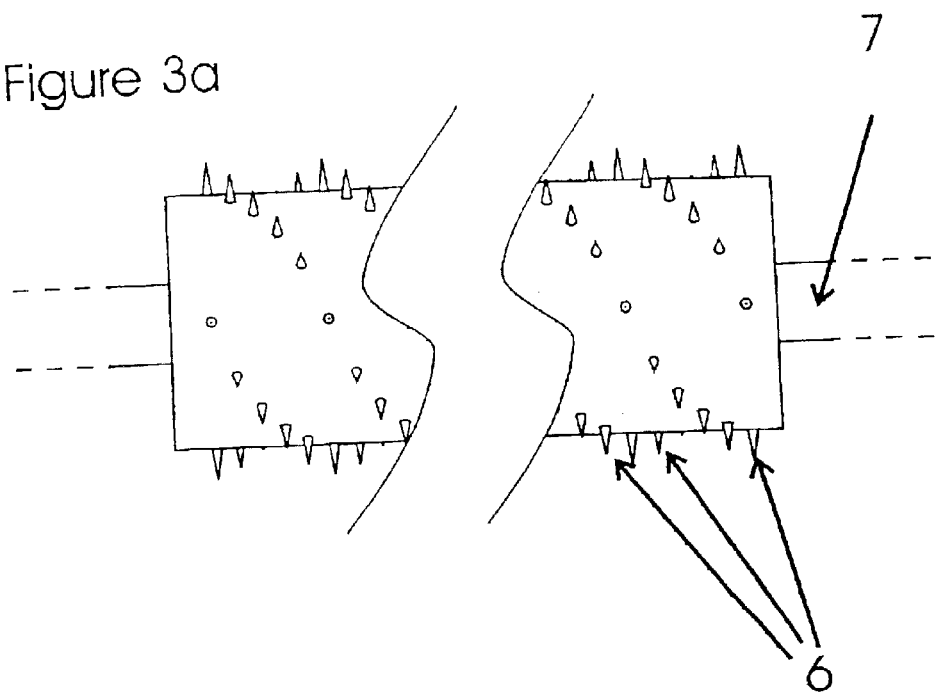
FIGS. 3a to 3c show details of a feed drive.
Figure 3B:
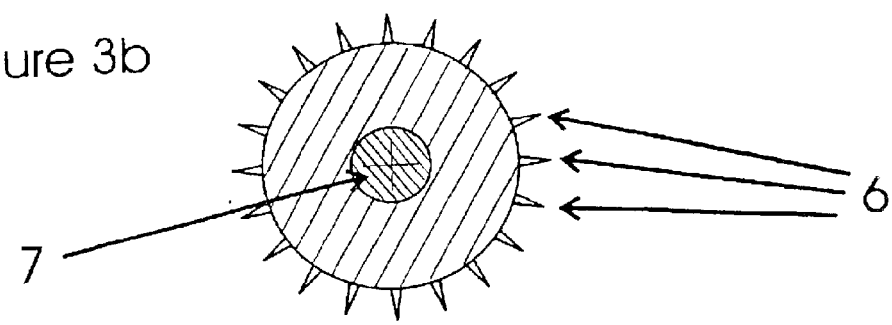
Figure 3C:
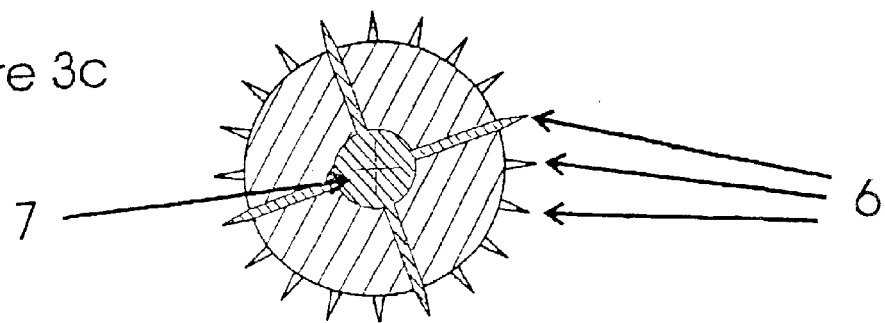

The roller mechanism 4 is shown in FIGS. 3a to 3c. FIG. 3a shows a transverse view, 3b a lateral view, and 3c a lateral section. The function of the roller mechanism 4 is to pass the cheque past the digital scanner 3, and also to permanently mark the cheque as having been scanned. To this end, it incorporates steel tines 6 which puncture the cheque and allow the rotary motion of the axle 7 to be transferred to horizontal motion of the cheque. As shown in FIG. 3c, there is a conductive connection between the axle 7 and the steel tines 6. In addition, beneath the axle 7 and incorporated into the structure of the cheque feed path 5, is a capacitive plate 8 such that during normal operation the capacitance between the capacitive plate 8 and the steel tines 6 is constant. This is monitored by the controller 9 allowing it to ensure that the steel tines 6 will puncture the cheque. The axle 7 is connected to a motor at one end in the usual way.

If it is required that a previously processed cheque be unable to pass through the apparatus a second time, an alternative cancellation device can be used. In this instance, two cutting wheels (not shown) may be provided in the feed path 5 such that they will cut the cheque after it has passed over the digital scanner 3. They are oriented to cut incisions into the cheque parallel to the motion of travel, and spaced equally from the centre-line of the cheque. They may be controlled such that they do not cut an incision further into the length of the cheque than the furthest distance that a previously processed cheque can be allowed to pass into the apparatus if it is inserted a second time. In addition to the cutting wheels following the digital scanner 3, wheels may be included in the feed path prior to the digital scanner 3 which serve to hold down the outside edges of the cheque while deflecting the inside portion upwards over a lip. The cheque is thus prevented from progressing further than the deepest point of incision. It may be desirable for the centre wheel in the feed path 5 to be free to move in a vertical direction so that an uncut cheque will not be overly deformed in passing over it.

Figure 4A:
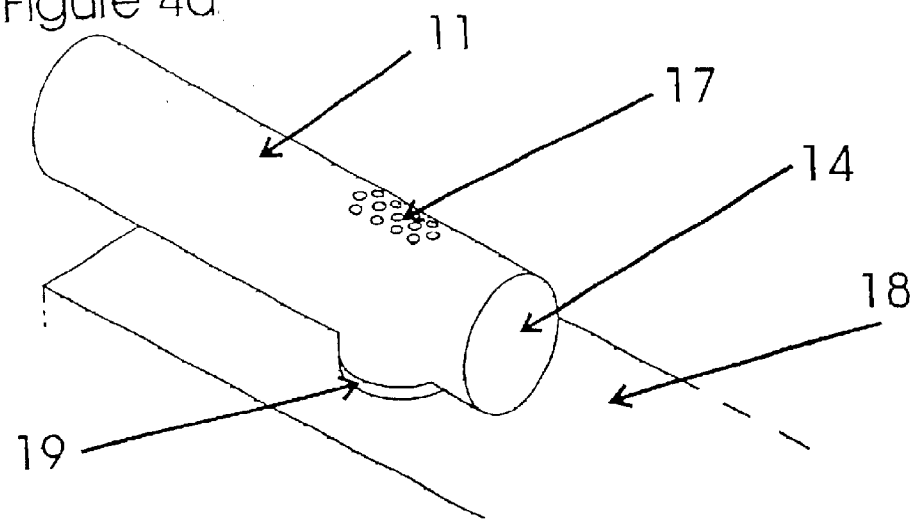
FIGS. 4a to 4c show a pressure sensitive security device.
Figure 4B:
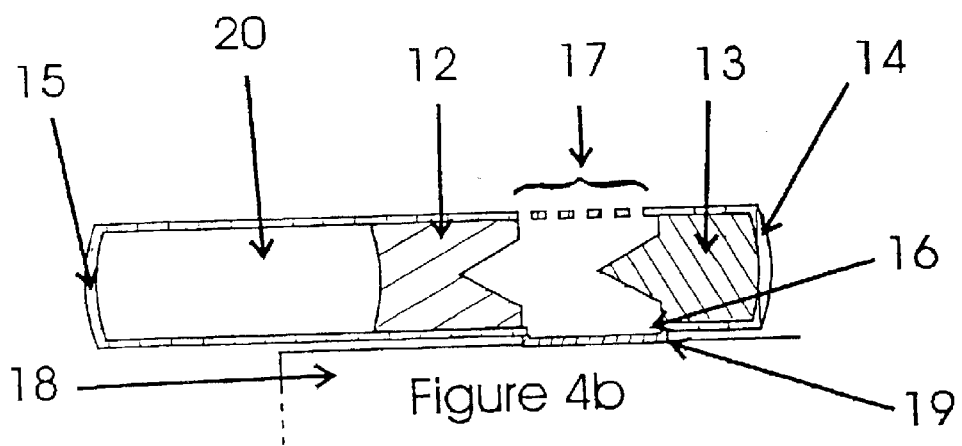
Figure 4C:
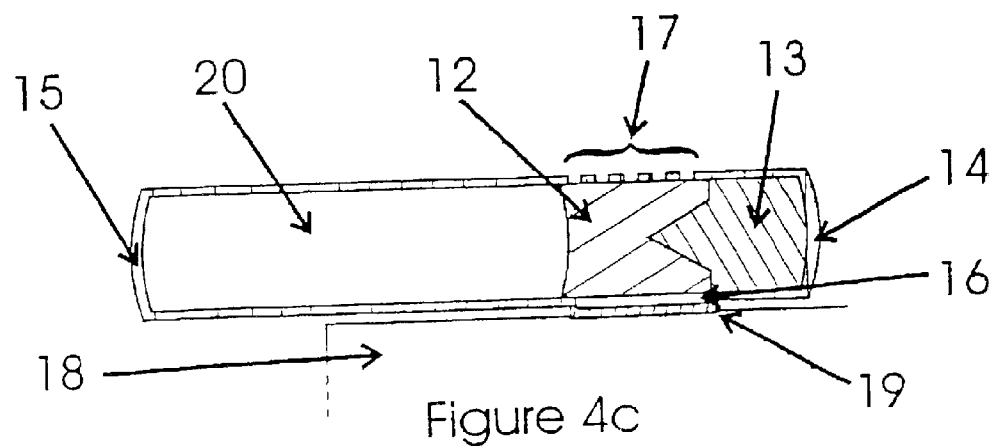

The security device 10 shown in FIGS. 4a to 4c consists of a metal tube 11, and chemical plugs 12 and 13. The metal tube 11 is constructed such that each end is closed (14, 15), but there is a hole 16 in the wall, and a porous section 17. The metal tube 11 is attached to an ultraviolet-sensitive EPROM 18 such that the window 19 of the EPROM 18 covers the hole 16.

Chemical plug 13 is attached to the closed wall 14, but plug 12 is placed such that it separates the gap 16 and porous section 17 from a sealed air gap 20. During construction of the apparatus, plug 12 is held in the position shown in FIG. 4b until the external casing 1 comes to be sealed. When the external casing 1 is sealed, the volume of the air inside the apparatus is increased such that plug 12 moves to the position shown in FIG. 4a. In case of a subsequent breach of the external casing, the air pressure inside the apparatus will decrease, and plug 12 will be forced to the position shown in FIG. 4c by the expansion of the air inside the air gap 20, whereupon the chemicals comprising plugs 12 and 13 react to enpose enough ultraviolet light at the correct wavelength to erase some or all of the data contained within the EPROM 18, such that the secret data cannot be reliably reconstructed from the subsequent contents.

As an alternative security measure, the secret data can be held on a dynamic RAM of sufficient size instead of an EPROM. In this case, the data is held in the RAM by the application of power from, for example, a lithium cell of sufficient size and durability to be active for the intended lifespan of the apparatus. The connection from the lithium cell to the RAM is made via a pressure-sensitive switch, arranged such that when the pressure drops below a certain point within the apparatus, the connection is broken. The effect of this is the loss of the data held in the RAM.

What is claimed is:

1. An apparatus for processing checks comprising:
   a closed casing having an opening defining a feed path for the insertion of a check;
   a scanner for receiving the check fed into the casing and for scanning the check to record a digital image of the check;
   a cancellation device which is operative to cancel the check concurrently with and directly after the scanning of the check; and,
   a communications device for transmitting the digital image of the check to a remote location.

2. The apparatus according to claim 1, in which the scanner obtains the digital image representing substantially all information on the check.

3. The apparatus according to claim 1, further comprising a feed drive that transports the check along a feed path.

4. The apparatus according to claim 3, in which the feed drive forms part of the scanner.

5. The apparatus according to claim 1, wherein the cancellation device is further operative to function as a feed drive.

6. The apparatus according to claim 3, in which the feed drive is operative to return the cancelled check.

7. The apparatus according to claim 1, wherein the cancellation device is operative to physically alter the check so that is unable to pass through the apparatus more than once.

8. The apparatus according to claim 1, when the cancellation device is operative to physically alter the check in a manner that can be detected during subsequent passes of that check through the apparatus by analysis of the scanned image of the check.

9. The apparatus according to claim 1, further comprising means for verifying the functionality of the cancellation device.

10. The apparatus according to claim 1, in which the scanner is an optical scanner.

11. The apparatus according to claim 1, in which the scanner also records magnetic information.

12. The apparatus according to claim 1, further comprising tamper responsive means for disabling the apparatus if the physical integrity of the casing is compromised in an unauthorized manner.

13. The apparatus according to claim 12, in which the tamper responsive means is operative to destroy the functionality of the apparatus.

14. The apparatus according to claim 12, in which the tamper responsive means is responsive to a change in air pressure within a predetermined region within the casing.

15. The apparatus of claim 1, wherein said apparatus is a part of an automatic telling machine.

16. The apparatus of claim 1, wherein said apparatus is a part of a financial communications system.

* * * * *